Nov. 29, 1938.  E. C. RANEY  2,138,509
MULTIPLE CONTROL SWITCH
Filed April 29, 1932  5 Sheets—Sheet 3
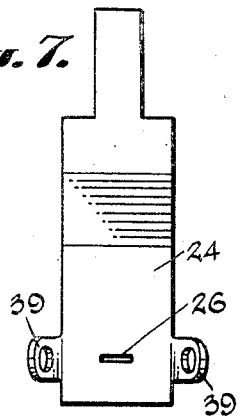
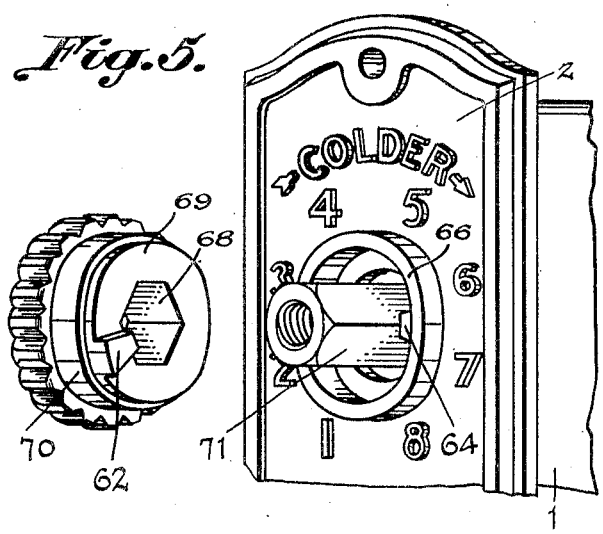
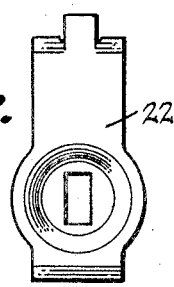
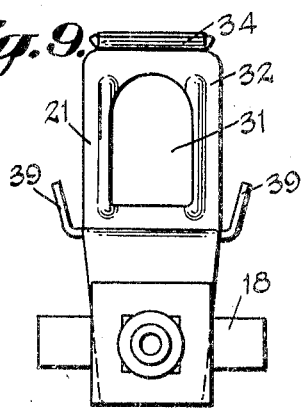
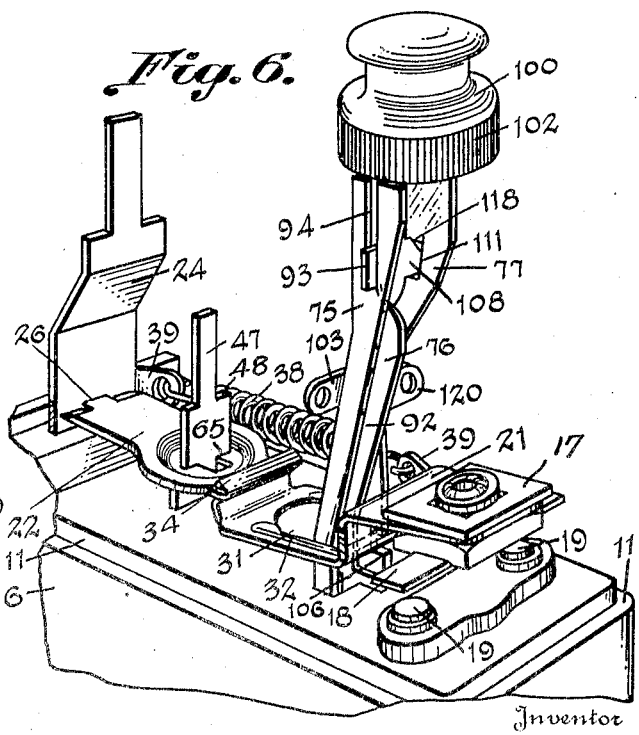
Inventor
Estel C. Raney
By Faust F. Crampton
Attorney

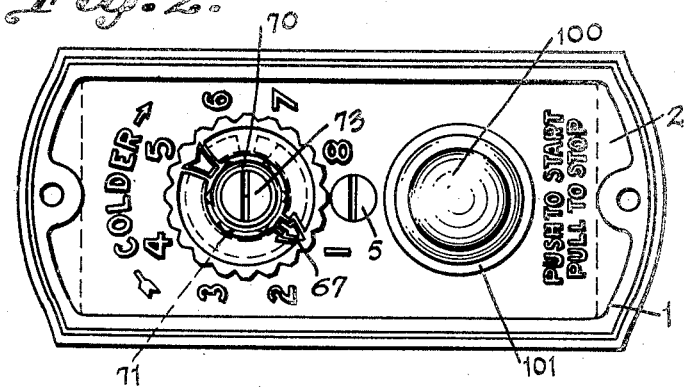

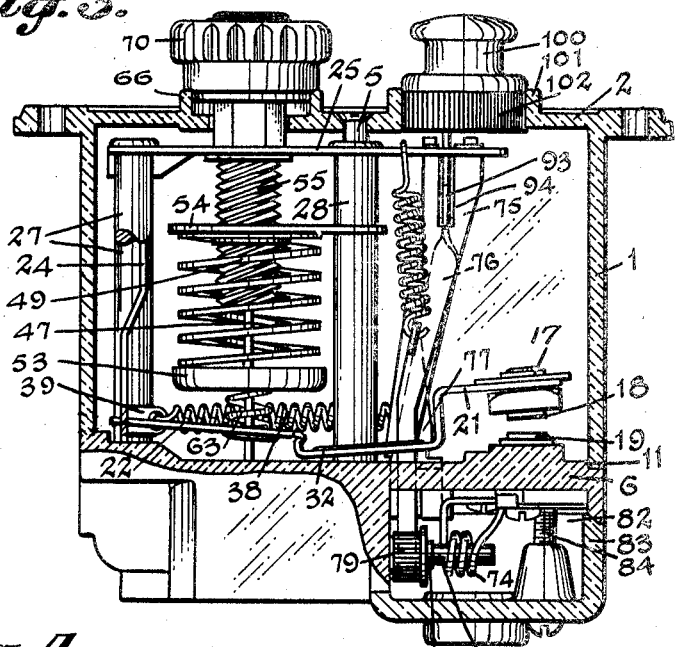
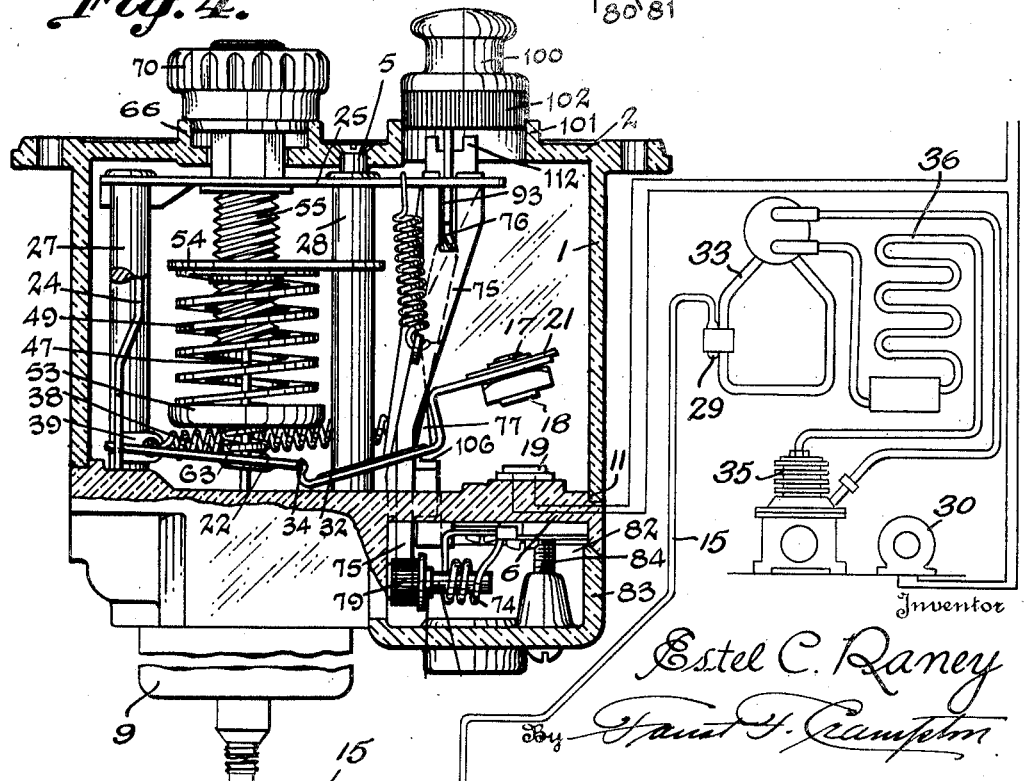

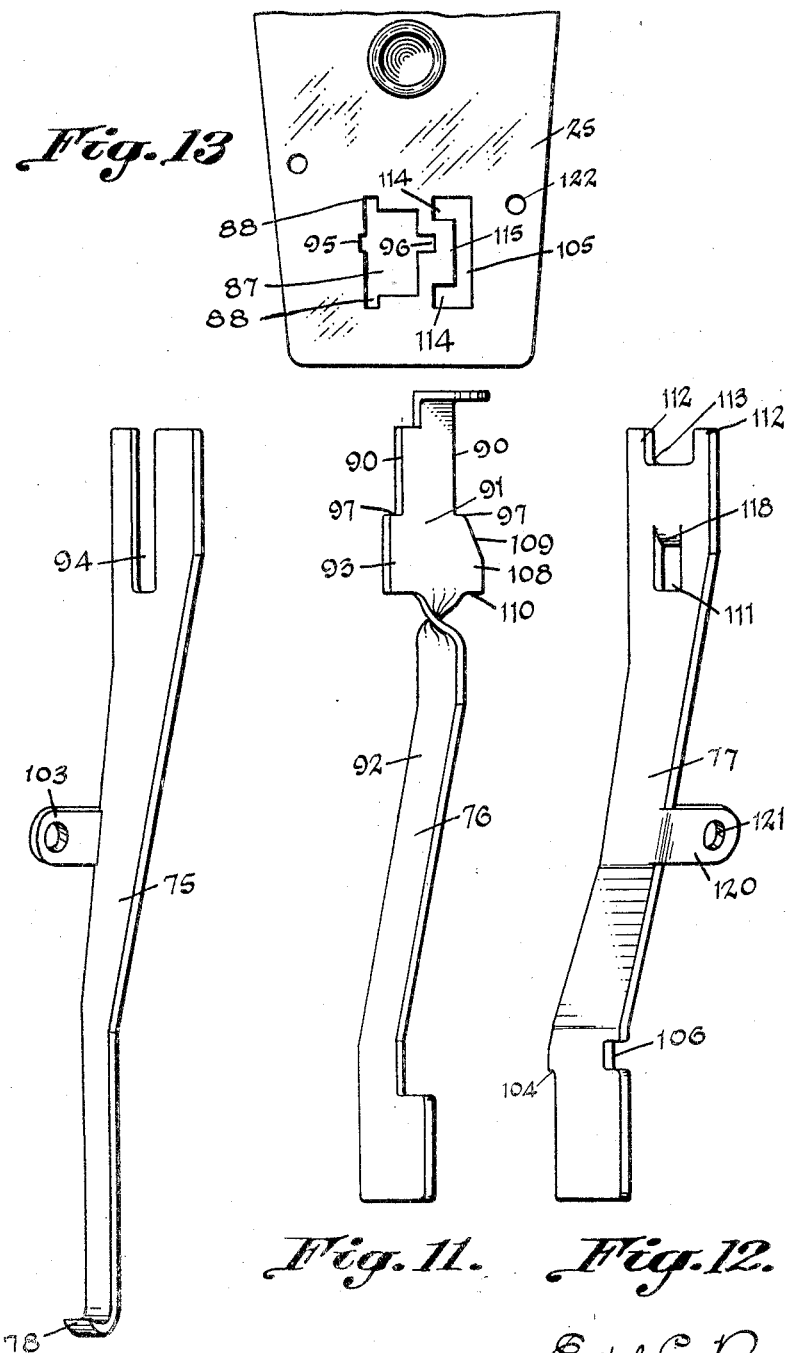

Nov. 29, 1938.  E. C. RANEY  2,138,509
MULTIPLE CONTROL SWITCH
Filed April 29, 1932  5 Sheets-Sheet 5
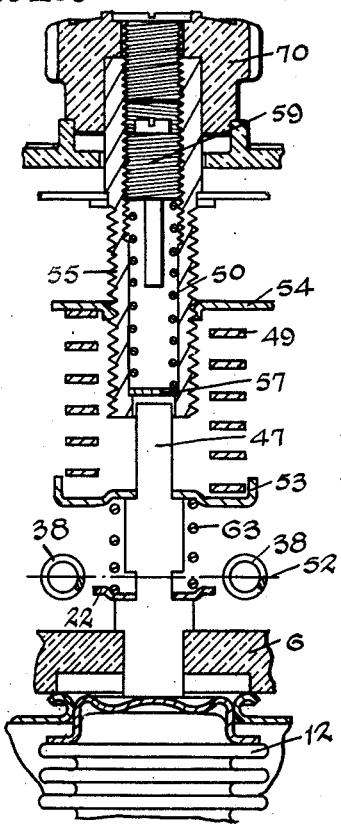
Fig. 17.
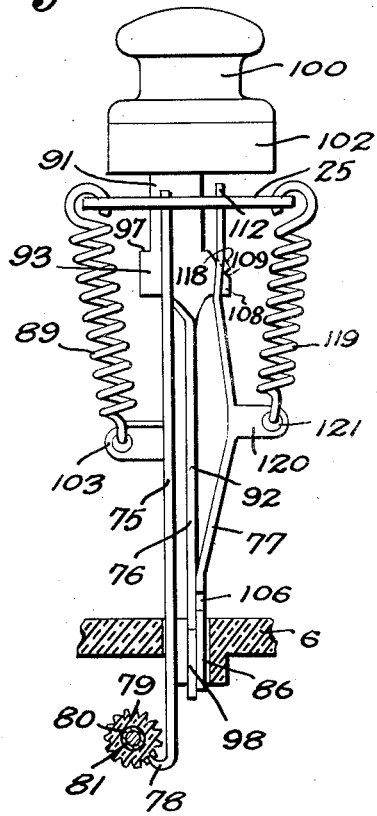
Fig. 16.
Fig. 15.
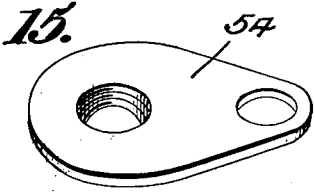
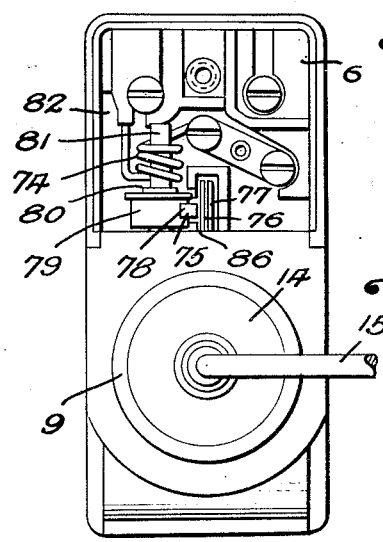
Fig. 14.
Inventor
Estel C. Raney
By Faust & Crampton.
Attorney Patented Nov. 29, 1938

2,138,509

UNITED STATES PATENT OFFICE 2,138,509

MULTIPLE CONTROL SWITCH

Estel C. Raney, Columbus, Ohio, assignor to Ranco Incorporated, a corporation of Ohio Application April 29, 1932, Serial No. 608,319

8 Claims. (Cl. 200—81)

My invention has for its object to provide an efficient multiple control switch having coacting and inter-related parts that may be easily assembled in an apparatus controlled thereby and may be readily adjusted to produce desired accurate responsive movement of the movable contact of the switch according to different controlling conditions produced in the apparatus, means being also provided for the manual operation of the switch independent of the operation of the automatic operations.

The switch is of particular value when used for controlling refrigerators wherein a compressor is intermittently operated by an electric motor. The movable contact of the switch is operated automatically to close the circuit of the motor to maintain the temperature of a part of the refrigerator system within desired temperature limits or it may be automatically operated to prevent injury to the motor by an excess flow of current and release it from the control of the refrigerator system or it may be manually operated to open the motor circuit or restore it to the control of the temperature conditions of the refrigerating system and the control motor circuit as may be desired.

The invention also provides means for producing a wide separation of the switch contacts when operated manually or by an excess current flow such as when the motor is overloaded or stalled to insure protection of the motor and enable the use of the control switch in connection with motors and refrigerating apparatus having a wide range of capacities.

The invention also provides means for readily substituting switch operating pressure members whereby the switch may be used with refrigerating apparatus of different capacities or may be operated by direct refrigerant pressure or by pressure created by heat transmission.

The invention consists in other features and advantages which will appear from the following description and upon examination of the drawings. Structures containing the invention may partake of different forms and may be varied in their details and still embody the invention. To illustrate a practical application of the invention, I have selected a multiple control switch embodying the invention as an example of the various structures and the details of such structures that contain the invention, and shall describe the selected structure hereinafter, it being understood that variations may be made and that certain features of my invention may be used to advantage without a corresponding use of other features of the invention, and without departing from the spirit of the invention. The particular structure selected is shown in the accompanying drawings.

Fig. 1 illustrates a view of a section of the switch and the position of the parts when the switch is closed. Fig. 2 is a face view of the shell containing the switch. Fig. 3 illustrates the position of parts of the switch when the movable contact of the switch is located in one open position. Fig. 4 illustrates the control device connected to a refrigerating system shown diagrammatically. It illustrates the positions and parts of the switch when the movable contact of the switch is in another open position. Fig. 5 is a composite view and illustrates a knob displaced from the switch and a fragmentary view of the face of the shell. Fig. 6 illustrates a fragmentary view of the base and a perspective view of control elements of the switch to clearly show their assembled relations. Fig. 7 illustrates a front view of a plate that anchors one end of the movable jointed arm of the switch. Fig. 8 illustrates a top view of a plate that forms one of the parts of the jointed arm. Fig. 9 illustrates a top view of the plate that forms the other part of the jointed arm. Fig. 10 illustrates a perspective view of a switch control member. Fig. 11 illustrates a perspective view of a second switch control member. Fig. 12 illustrates a view of the third switch control member. Fig. 13 illustrates a plate having slots for guiding the movement of the control members illustrated in Figs. 10, 11, and 12. Fig. 14 illustrates a view of the rear end of the shell, a cover plate for one of the chambers of the base part of the shell being shown removed. Fig. 15 illustrates a plate that cooperates with a screw to adjust the pressure of one of the pressure controlling springs. Fig. 16 illustrates a view of members that control the operation of the switch when the switch is in position to be operated by the bellows. Fig. 17 illustrates diagrammatically the relative location of parts of the switch.

The multiple control switch, illustrated in the drawings, is contained within a shell 1. The shell has a face plate or end part 2 through which extend switch control members convenient for observation and manual manipulation and a base part 6 for closing the end of the shell. The base 6 forms a support for parts of the switch and a frame 10 to which parts are connected or by which parts are guided. The shell body fits a shoulder 11 formed in the edge of the base and the base is removably connected to the shell by a screw 5 that extends through the face plate or end part 2 of the shell and into the frame 10. Thus the parts of the switch are rendered readily accessible for by unscrewing the screw 5, the switch parts may be removed from the shell and its support.

The base 6 is provided with a socket 7 for removably connecting a bellows 12 to the switch. The bellows 12 is located in the cup 9 and the walls of the socket and the shell have a screw formation 8 whereby the cup 9 and consequently the bellows may be connected to the base 6.

The bellows is seated on the bottom 14 of the cup 9. Its upper end protrudes through the upper end of the cup 9 and is moved relative to the end of the cup 9 upon its expansion or contraction. A pipe 15 is connected to the end of the bellows through the bottom of the cup 9 and the parts are so formed as to enable rotatable movements of the cup 9 relative to the pipe and bellows to enable ready connection of the bellows to the base 6.

Replaceability of the bellows renders the switch usable with refrigerators having a variety of capacities by the use of bellows having different sizes and also it enables the use of bellows having parts for connecting them with the apparatus for direct refrigerant pressure control or indirect pressure control as by thermic control.

A suitable thermic expansible liquid having a low boiling point may be inserted in the bellows and pipe and its changes in pressure due to changes in temperature will operate the bellows. Or if the bellows is connected to the low pressure side of the refrigerating apparatus, the refrigerant fluid used in the refrigerating apparatus will be introduced into the pipe and the bellows and will vary the volume of the bellows according to the pressure within the part of the apparatus to which the pipe is connected, and consequently substantially according to the temperature of the chilling unit of the refrigerator.

Where the bellows is operated by pressure produced by heat transmission, the pipe 15 may be closed at its end or it may be connected to a bulb 29. The end of the pipe or the bulb, if a bulb is used, is mounted in the refrigerator in close heat conductive relation with the chilling unit to correspondingly affect the pressure within the bellows.

As indicated in Fig. 4 the motor 30 is connected to the switch 17 and the circuit of the motor is opened and closed by the switch which is operated by the bellows 12 when the bellows reaches definite points in its expansion as affected by the temperature of the chilling unit 33. The motor 30 operates the compressor 35 which draws the refrigerant from the chilling unit 33 and forces it into the condenser 36 from which it is directed into the evaporator or chilling unit 33 in the manner well known in the art.

The multiple control switch 17 has a movable contact member 18 that is adapted to complete the circuit between a pair of fixed contacts 19. The movable contact member 18 is insulatingly supported on a jointed switch arm formed of a pair of relatively movable plates 21 and 22. The plate 21 is spring pressed endwise by the springs 38 against the end of the sheet metal plate 22 which is, in turn, pressed against the strip 24 that is connected to the base 6 and the plate 25 that forms a part of the frame 10. The movable plate 21 is provided with a depressed portion 32 and a V-shaped recess 34. The ends of the plate 22 are knifed and engage one in the V-shaped recess 34 of the plate 21 and the other in a slot 26 of the strip 24 against which it shoulders to permit angular movements of the plates 21 and 22 relative to each other and relative to the strip 24.

The springs 38 are connected to the ears 39 formed on the strip 24 and the plate 21 and produce pressure components at the joint between the plates and at the movable contact 18 in directions substantially at right angles to the line of direction of the pressure exerted by the springs 38, the plates being yieldingly held in these positions for short, angular movements by the springs 38 as determined by suitable limiting stops and the fixed contacts 19 for limiting the movement of the plates and the movable contact 18.

The plates 21 and 22 are moved by the bellows operating through a rod 47 to locate the joint between the plates either above or below the plane of the axes of the springs 38 to produce a corresponding change in the direction of the lateral components to produce corresponding opening or closing movements of the switch.

In order to maintain the contact pressure of the switch materially above the zero pressure, viz., that pressure would be caused if the joint between the plates 21 and 22 was maintained in the plane of the axes of the springs 38, and a spring 63 is located intermediate the flanged disc 53 and the plate 22, and operates to move the joint of the switch arm through the plane of the lines of pressure produced by the springs 38 before the lateral components at the joint and at the movable contact becomes zero. The notches 65 formed in the rod 47 and having edges located on opposite sides of the plate 22, provide a short floating movement of the switch arm plate 22 relative to the rod 47 when the plate 22 is moved into switch opening and closing positions. As the notches 65 approach the plane of the axes of the spring 38 in a switch opening movement, the lateral pressure component exerted by the springs 38 in the direction to maintain the switch closed reduces until it is slightly less than the pressure of the spring 63 whereupon the spring 63 snaps the joint through the plane of the springs 38 to reverse the lateral components causing them to be exerted in directions to open the switch. This maintains the lateral components materially above zero and consequently maintains the contact pressure materially above zero and prevents burning or oxidizing of the surfaces of the switch contacting area, that would otherwise result from low contact pressure.

The temperatures at which the switch is closed is adjusted by means of the screws 55 and 59 that adjust the pressure of the springs 49 and 50 that counteract the pressure of the fluid within the bellows. Preferably, the adjusting screw 55 is bored and contains the spring 50 and its adjusting screw 59. The spring 50 is engaged as the switch is closed.

The spring 49 is located intermediate a flanged disc 53 and an adjusting plate 54. The disc 53 is supported on the rod 47. The rod 47 is provided with a pair of shoulders 48 and the end of the rod extends through an opening formed in the disc 53, which is pressed against the shoulders 48 by the spring 49. The plate 54 has a threaded opening and the screw 55 extends into the threaded opening and adjusts the location of the plate 54 and consequently adjusts the pressure of the spring 49 against the disc 53 and the pressure of the rod 47 against the end of the bellows 11.

Rotation of the plate 54 with the screw 55 is prevented by means of a rod 28 that forms a part of the frame 10 and extends through the plate.

The spring 50, which is located within the bore formed in the screw 55, presses against a disc 57 that normally rests against a pair of shoulders 46 formed at the edge of the opening in the end of the screw 55 in which the end of the rod 47 moves to engage the disc 57. The spring 50 is adjustably pressed against the disc 57 by means of the screw 59 located within the screw 55.

The parts are so arranged that the end of the rod 47 comes in contact with the disc 57 just previous to the closing movement of the switch as the rod 47 is raised upon expansion of the bellows. As the bellows contracts, due to the operation of the compressor while the switch is closed, the rod 47 leaves the disc 57 and as the rod descends under the pressure of the spring 49 due to decrease in temperature of the refrigerator, the rod 47 eventually opens the switch. Thus, the pressure against the expansion of bellows is increasingly resisted just before the switch closes by the pressure of the spring 50, which, during this operation of the device, coacts with the spring 49. The rod 47 is relieved from the pressure of the spring 50 during other movements of the bellows, and, consequently, the switch opening movement is not affected by the pressure of the spring 50. Increase in the tension of the spring 50 by the means of the screw 59 operates to adjustably increase the temperature differential between the opening and closing temperatures of the switch.

The screw 55 is rotatably supported in the plate 25 that forms a part of the frame 10. It is provided with suitable shoulder and washer for preventing longitudinal movements of the screw by reason of the pressure of the spring 49. The screw 55 extends to the end of the shell 1 and in position to enable adjustment of the spring 49 by the expert. Also, the screw 59 is accessible for adjustment of the spring 50 to adjust the temperature differential by the expert.

A knob 70 having a suitable arrow 67 or other dial pointer, may be adjustably connected to the end of the screw 55 to enable ready adjustment of the temperature of the refrigerator by the user. The adjustment that may thus be made by the user, however, is limited to a definite range by suitable stops 62 and 64 for limiting the rotation of the screw by the operation of the knob 70. The end 71 of the screw 55 and a socket 68 in the hub 69 of the knob 70 are so formed hexagonal as to enable connection of the knob to the screw 55 to locate the arrow 67 or pointer at different angles with respect to the circumference of the screw and, thus, enable adjustment of the screw 55 when the knob 70 is removed to raise or lower the range of adjustability by the use of the knob as determined by the stops 62 and 64 and enable reconnection of the knob to locate the arrow pointer at any number of the dial which ordinarily would be the same number at which it was located before the adjustment of the screw 55 was made.

The knob 70 may be secured in its position on the end of the screw 55 by means of a screw 73 that may be screwed into the threaded bore of the screw 55.

The switch is not only responsive to the refrigerating conditions existing in the apparatus but also to the current flow in the circuit of the motor as well as to manual operation for opening and closing the switch at will. In the construction shown, members 75, 76, and 77 are provided for positioning the movable contact in the vicinity of the fixed contacts in order that the circuit may be opened and closed by the operation of the bellows when the current is normal or to remove the movable contact to a point remote from the fixed contacts to place the movable contact in safe standing and enable use of the control device for controlling motors and refrigerating apparatus of different capacities. The members are interconnected to enable automatic and manual operation of the switch.

The members 75 and 76 extend through opening 31 formed in the movable plate 21 of the jointed switch arm and the opening 86 located in the base 6 and the opening 87 located in the plate 25. The member 77 extends through the opening 31 in the plate 21 and the opening 86 in the base 6 and the opening 105 in the plate 25. The edges of the openings 85, 86, 87, and 105 operate to guide the movements of the members.

The member 75 has a hook 78 adapted to engage a ratchet or ribbed cylinder 79 having a metal sleeve 80 that fits over a rod 81 that is fixedly connected to the base 6. The member 75 is connected to a tension spring 89 that tends to draw the hook against and rotate the ribbed cylinder 79. The cylinder 79 is located in the chamber 82 formed in the base 6. The chamber is closed by the cover plate 83. The cover plate 83 may be secured to the base 6 by means of a suitable screw 84. The rod 81 protrudes from the sleeve and a resistance wire 74 is wound around and spaced from the rod 81. The resistance coil 74 is connected through the switch to the motor circuit whereby flow of an excess current will heat the rod 81 and the rod 81 will transmit the heat into the sleeve 80. The rod 81 is connected to the sleeve 80 by a small quantity of solder of suitable alloy that will melt at a desired predetermined temperature and will immediately solidify when the temperature is reduced. Thus when a current flows that is sufficiently large to melt the solder, the cylinder 79 will be released and consequently, will release the member 75 that in turn operates through the other members 76 and 77 to open the switch.

The member 75 is provided with an ear 103 to which one end of the tension spring 89 is connected. The opposite end of the spring 89 is connected to the plate 25 at a point to incline the spring outward to pull the hook against the ribbed cylinder 79 as well as in an upward direction. The edges of the upper end portion of the member 75 are located in the notches 88 formed in the edge of the opening 87.

The member 76 has a part 91 that is located at right angles to the body part 92 of the member. The part 91 has a lug 93 that projects into a slot 94 formed in the member 75 and so as to be engaged by the end of the slot 94. The slot has a sufficient length to enable free movement of the lug 93 along the slot when the hook 78 of the member 75 is engaged by the ribbed cylinder 79. The edge portions 90 of the part 91 move in the notches 95 and 96 formed in the edges of the opening 87. The lug 93 forms a shoulder 97 that engages the plate 25 in the vicinity of the edge of the notch 95 when the member 76, is raised. Consequently when the member 75 is released, the spring 89 raises the member 75 and the member 76 by the engagement of the lower end of the slot 94 with the lug 93.

The member 77 is interconnected with the member 76 by means of the lug 108 formed on the member 76 and having an edge portion 109 that is inclined to the sides of the end of the member 77. The lug 108 has an edge 110 that forms a shoulder for engaging the member 77. The lug 108 projects into an opening 111 formed in the end of the member 77. The member 77 is limited in its downward movement by the shoulder 104 striking the base 6 when depressed by the operation of the member 76. The member 77 has a notch or recess 106. The opposed end edges of the notch 106 are located on opposite sides of the plate 21 and form limiting stops for limiting the extent of the switch opening movement of the plate 21 of the movable arm of the switch and yet permit free switch closing movements by the operation of the bellows when the member 77 is depressed substantially as shown in Fig. 3. When it is raised it locates the movable contact so remote from the fixed contacts substantially as shown in Fig. 4 that the switch cannot be closed by the operation of the bellows and so remote as to prevent injury of the motor. The movable contact of the switch is thus placed in a safe remote position that enables the use of motors of different capacities.

The upper end of the member 77 has a pair of lugs 112 forming the notch 113. The edge of the opening 105 has a pair of notches 114 having a width that will enable entrance of the lugs 112 into the notches 114. The notches 114 form a tongue 115 that engages the end of the member 77 in the notch 113 when the lugs 112 enter the notches 114 by a suitably biasing spring.

The displacement of the end of the member 77 laterally to disengage it from the tongue 115 of the plate is caused by an upward movement of the member 76. The outwardly inclined edge portion 109 of the lug 108 engages the end 118 of the opening 111 to move the end of the member 77 in a direction away from the member 76 to disengage the member 77 from the tongue 115. Preferably, the end 118 of the opening 111 has a sloping edge portion which coacts with the inclined edge 109 to move the end of the member 77 away from the member 76, whereupon the member 77 and the contact 18 will be drawn upward by the spring 119 to position the movable contact 18 remote from the fixed contacts 19 and prevent closing of the switch by the bellows. The ends of the spring 119 are hooked into the openings 121 and 122 of the plate 25 and the ear 120 formed in the member 77 which is biased to normally maintain the end of the member 77 in engaging relation with the tongue 115 on the plate 25.

The members 75 and 77 may be depressed by the manual operation of the member 76. If the member 75 has been released, the lug 93 of the member 76 engages the end of the slot 94 to push the member 75 down so that the hook 78 will engage the ribbed cylinder 79, and the lug 108 engages in the opening 111 until the end of the member 77 by reason of the biased relation of the spring 119 engages the tongue 115.

The upper end of the member 76 protrudes well above the plate 25 and a knob 100 may be connected to the end of the member 76. The knob 100 is conveniently located on the outside of the face plate 2 of the shell and has a hub portion 102 that is surrounded by a flange 101. When the member 76 has been pushed inward to enable engagement of the members 75 and 77 the hub portion 102 of the knob 100 moves within the flange 101 and is practically covered thereby. The part 102 of the knob, that is thus covered may be colored with a distinctive color, such as red. This will indicate, when the red color is displayed, that the switch is in an open position, or that the refrigerating apparatus is no longer functioning, and that in order to restore the operation of the apparatus, the knob 100 must be pushed inwardly to cover the red colored portion of the knob. Inward movement of the knob 100 operates to restore the switch to the control of the bellows.

In the operation of the multiple control switch, expansion of the bellows 12 operates to move the joint of the switch arm above the plane of the springs 38 and cause closing of the switch when the movable contact 18 is held in operative relation with the fixed contacts by the member 77. The movement of the bellows is resisted by the adjustable spring 49. It may be adjusted to enable the closing and opening of the switch at approximate desired temperatures. The spring 63 is located intermediate the flanged disc 53 and the jointed movable switch arm and operates to prevent a decrease in the lateral pressure component between the contacts of the switch below an efficient contact pressure and prevents burning of the contacts that would otherwise occur if the contact pressure approached zero. The spring 50 is engaged in the closing movement of the bellows, at a point in its movement, that it reaches before the lateral components reverse to cause the closing of the switch. The spring 50, however, is disengaged when the switch is closed and does not engage when the switch is opened. The spring 50 may be adjusted to produce the desired differential between the opening of the switch and the closing of the switch. The opening of the switch occurs at a temperature that is determined by the adjustment of the spring 49 while the closing of the switch is determined by the adjustment of the spring 50 and the spring 49. These adjustments are produced by means of the screws 55 and 59.

When the current through the heat coil 74 exceeds a predetermined amount the switch is released from the control of the bellows by releasement of the member 75 which engages the member 76. The upward movement of the member 76 trips the member 77 to cause the disengagement of its upper end from the tongue 115 of the plate 25 and enables a similar upward movement of the member 77 to raise the movable contact 18 and prevent closing of the switch by the operation of the bellows.

If desired, the switch may be manually relieved from control of the bellows by the operation of the knob 100, which trips the member 77, whereupon the spring 119 will likewise raise the movable contact 18 away from the fixed contacts 19 and produce an exceedingly wide opening of the switch. The control of the bellows may be restored by the inward movement of the knob 100 which will push the member 77 downward, and move the part 21 of the switch arm into position to be operated by the bellows 12. If the contact has been operated by reason of the release of the member 75 from the ribbed cylinder 79, the restoring movement of the member 76 will also restore the connection of the member 75 with the ribbed cylinder 79.

I claim:

1. In a thermostatic switch, an enclosing shell, a contact for opening and closing an electric circuit, means for opening and closing the contact in response to temperature variation, an overload current operating means, a manual operative member extending through the switch shell and operated by the said overload means, said member having a distinctive colored part disposed outside of the surface of the shell when the switch is opened due to overload current and covered by the shell when the switch is in the normal operating position.

2. In a switch, a shell for containing the switch, a pressure device for automatically operating the switch, a control member extending through one end of the shell and having a distinctly colored part and movable relative to the shell to expose and cover the colored part of the control member when in different positions, and having means for engaging the movable contact of the switch for opening the switch and preventing closing of the switch by the pressure device when moved to expose said part, and a current overload device for automatically operating the control member to open the switch.

3. In a refrigerator control switch, a shell for containing the switch, a pressure device for operating the switch according to refrigerating conditions in the refrigerator, a pair of control members located on one end of the shell, one of the control members rotatively operated to adjust the pressures at which the switch will be operated, the other of the control members longitudinally movable through the end of the shell and having a normally shell covered distinctively colored part exposed when moved outward with respect to the shell and having means for preventing the operation of the switch by the pressure device when moved outwardly with respect to the shell.

4. In a thermostatic control switch, a pressure operated element for operating the switch to make and break the electric circuit therethrough, means for opening said switch independently of said pressure element in response to overload current, said means having a self-soldering ratchet operatively responsive to said overload current, a spring actuated latch normally engaging said ratchet and effective to open said switch when released by the ratchet upon a predetermined current condition, a member for restoring said latch to engage said ratchet, said member being normally disconnected from said latch and including means for opening and closing said switch manually.

5. In a switch, a shell for containing the switch, a pressure device for automatically operating the switch, a shell, a switch control member for preventing closing of the switch in response to the pressure device, a ratchet wheel, a fixed pin located within the ratchet wheel, a coil surrounding the pin and connected in the circuit of the switch, a solder material interconnecting the pin to the ratchet and operative to release the ratchet when disconnected therefrom, the control member having a hook for engaging the ratchet, the said ratchet pin located on the outside of the shell, a cover means for covering the said ratchet and pin and accessible upon removal of the said cover means.

6. In combination with a thermic control switch, a shell for containing the switch, a second shell having means for connecting the said second shell to the first named shell by rotative movements of the second shell, a metal bellows containing an expansible fluid and located within the second shell and having an end portion protruding through the wall of the second shell, a tube communicating with the bellows and extending to a point at which the temperature thereof is determinative of the operation of the switch, the bellows responsive to the changes of pressure of the fluid in the tube, and means for removably connecting and disconnecting the bellows to the switch upon connection and disconnection of the second shell to the first named shell.

7. In a refrigerator control switch, a movable switch member and a fixed switch member, a pressure device responsive to operating conditions of the refrigerator for operating the movable switch member to open or closed position with respect to the fixed switch member, a spring for counteracting the pressure of the pressure device, a rotative element for adjusting the pressure of the spring to vary the switch operating pressure of the device, a shell for enclosing the switch, a pair of control members extending through and located on one end of the shall, one of the control members for operating the element, the other of the control members having means for limiting the movement of the movable switch member when the same is opened by the operation of the pressure device, and means associated with the second mentioned control member for engaging the movable switch member and for removing the movable switch member to a position such as to prevent closing of the switch notwithstanding the closing movements that may be produced by the pressure device.

8. In a control switch, a pressure operated element, a switch element operable thereby to make and break an electric circuit, overload means also operable to break said electric circuit, said overload means comprising a thermally releasable catch and a latch releasable by reason of said catch engaging therewith, said latch being operatively connected with said switch element to thereupon cause it to move to circuit breaking position.

ESTEL C. RANEY.